(12) United States Patent
Nagano

(10) Patent No.: US 10,547,049 B2
(45) Date of Patent: Jan. 28, 2020

(54) METHOD FOR PRODUCING ELECTRODE ASSEMBLY AND METHOD FOR PRODUCING LITHIUM-ION BATTERY

(71) Applicant: SEIKO EPSON CORPORATION, Tokyo (JP)

(72) Inventor: Daisuke Nagano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 29 days.

(21) Appl. No.: 16/070,451

(22) PCT Filed: Jan. 18, 2017

(86) PCT No.: PCT/JP2017/001573
§ 371 (c)(1),
(2) Date: Jul. 16, 2018

(87) PCT Pub. No.: WO2017/130818
PCT Pub. Date: Aug. 3, 2017

(65) Prior Publication Data
US 2019/0036107 A1    Jan. 31, 2019

(30) Foreign Application Priority Data
Jan. 28, 2016 (JP) .................. 2016-014064

(51) Int. Cl.
*H01M 4/1391* (2010.01)
*H01M 10/052* (2010.01)
(Continued)

(52) U.S. Cl.
CPC ......... *H01M 4/1391* (2013.01); *H01M 4/622* (2013.01); *H01M 10/052* (2013.01);
(Continued)

(58) Field of Classification Search
CPC combination set(s) only.
See application file for complete search history.

(56) References Cited

U.S. PATENT DOCUMENTS 5,234,778 A * 8/1993 Wright .................. H01M 4/661
429/103
5,401,598 A * 3/1995 Miyabayashi ........ H01M 4/133
429/231.9

(Continued)

FOREIGN PATENT DOCUMENTS

| JP | 2014-096391 A | 5/2014 |
| JP | 2015-144061 A | 8/2015 |
| JP | 2015-153452 A | 8/2015 |

OTHER PUBLICATIONS

Feb. 21, 2017 International Search Report issued in International Patent Application PCT/JP2017/001573.

*Primary Examiner* — Kaity V Chandler
(74) *Attorney, Agent, or Firm* — Oliff PLC

(57) ABSTRACT

A method for producing an electrode assembly which includes a first step of forming a molded body that contains an active material, a second step of dipping the molded body in a melt of a solid electrolyte in a first atmosphere, thereby impregnating the melt into voids inside the molded body; and a third step of cooling the molded body impregnated with the melt by moving the molded body to a second atmosphere whose temperature is lower than that of the first atmosphere, thereby combining the molded body with the solid electrolyte.

10 Claims, 11 Drawing Sheets

(51) Int. Cl.
  *H01M 10/0562* (2010.01)
  *H01M 10/0585* (2010.01)
  *H01M 4/62* (2006.01)
  *H01M 4/02* (2006.01)

(52) U.S. Cl.
  CPC ... *H01M 10/0562* (2013.01); *H01M 10/0585* (2013.01); *H01M 2004/021* (2013.01); *H01M 2004/028* (2013.01)

(56) References Cited

U.S. PATENT DOCUMENTS

| | | | | |
|---|---|---|---|---|
| 5,476,732 A * | 12/1995 | Coetzer | | H01M 4/36 |
| | | | | 205/57 |
| 5,573,871 A * | 11/1996 | Von Benda | | H01M 4/70 |
| | | | | 429/103 |
| 5,604,053 A * | 2/1997 | Coetzer | | H01M 4/582 |
| | | | | 29/623.1 |
| 5,716,731 A * | 2/1998 | Goetzer | | H01M 10/39 |
| | | | | 429/103 |
| 5,972,533 A * | 10/1999 | Coetzer | | H01M 10/39 |
| | | | | 429/102 |
| 6,007,943 A * | 12/1999 | Coetzer | | H01M 10/39 |
| | | | | 429/102 |
| 6,200,707 B1 * | 3/2001 | Takada | | H01M 4/621 |
| | | | | 429/212 |
| 8,980,459 B1 * | 3/2015 | Sammells | | H01M 4/02 |
| | | | | 429/103 |
| 2004/0041537 A1 * | 3/2004 | Ishida | | H01M 2/0212 |
| | | | | 320/107 |
| 2012/0225351 A1 * | 9/2012 | Kojima | | H01M 4/0404 |
| | | | | 429/211 |
| 2014/0216631 A1 * | 8/2014 | Teraoka | | H01M 4/1391 |
| | | | | 156/89.12 |
| 2014/0216632 A1 * | 8/2014 | Ichikawa | | H01M 4/0433 |
| | | | | 156/89.12 |
| 2015/0221979 A1 | 8/2015 | Teraoka et al. | | |
| 2015/0228981 A1 | 8/2015 | Teraoka et al. | | |
| 2016/0028103 A1 * | 1/2016 | Yokoyama | | H01M 10/056 |
| | | | | 429/304 |
| 2016/0072153 A1 * | 3/2016 | Ichikawa | | H01M 2/1646 |
| | | | | 429/103 |
| 2016/0093875 A1 * | 3/2016 | Teraoka | | H01M 4/1391 |
| | | | | 429/322 |
| 2016/0336617 A1 * | 11/2016 | Yamazaki | | H01M 10/0562 |
| 2016/0359190 A1 * | 12/2016 | Teraoka | | H01M 10/0562 |
| 2017/0170515 A1 * | 6/2017 | Yushin | | H01M 10/0562 |

\* cited by examiner

METHOD FOR PRODUCING ELECTRODE ASSEMBLY AND METHOD FOR PRODUCING LITHIUM-ION BATTERY

The entire disclosure of Japanese Patent Application No. 2016-014064, filed Jan. 28, 2016 is expressly incorporated by reference herein.

TECHNICAL FIELD

The present invention relates to a method for producing an electrode assembly and a method for producing a lithium-ion battery.

BACKGROUND ART

As a method for producing an electrode assembly to be used as an electrode of a lithium-ion battery, for example, PTL 1 discloses a method for producing an electrode assembly including a step of forming a first solid electrolyte in a plurality of voids of a porous active material molded body containing a lithium composite oxide, and a step of impregnating a precursor solution of an amorphous second solid electrolyte which conducts lithium ions into the active material molded body in which the first solid electrolyte is formed, followed by a heat treatment, thereby forming the second solid electrolyte in the plurality of voids.

It is said that by using the thus produced electrode assembly, the plurality of voids of the active material molded body are filled with the first solid electrolyte and the second solid electrolyte, and therefore, a lithium-ion battery capable of obtaining sufficient output and increasing the capacity can be obtained.

CITATION LIST

Patent Literature

PTS 1: JP-A-2015-144061

SUMMARY OF INVENTION

Technical Problem

According to the method for producing an electrode assembly of the above-mentioned PTL 1, also in the step of forming the first solid electrolyte in the plurality of voids of the porous active material molded body, the precursor solution of the first solid electrolyte is impregnated in the same manner as in the case where the second solid electrolyte is formed. That is, the first solid electrolyte and the second solid electrolyte are sequentially formed in the plurality of voids by a heat treatment after impregnating the active material molded body using each of two types of precursor solutions.

Therefore, when the precursor solutions are impregnated into the active material molded body, it is necessary to adjust the amounts of the respective precursor solutions in consideration of the porosities of the individual active material molded bodies. In other words, it has a problem that it takes time and labor to determine the porosities of the individual active material molded bodies beforehand. Further, when the individual active material molded bodies vary in porosity, there is a fear that the prepared precursor solutions may be wasted.

Further, a heat treatment (firing) is performed after the precursor solution is impregnated into the active material molded body, and therefore, when the heat treatment (firing) is repeated, thermal history remains in the electrode assembly. When the heat treatment is performed at a high temperature for a long time, lithium is desorbed from the active material molded body or the solid electrolyte, and therefore, a compositional change occurs, and there is a fear that it may affect the ion conduction property of the electrode assembly.

Solution to Problem

The invention has been made to solve at least part of the above-mentioned problems and can be realized as the following forms or application examples.

APPLICATION EXAMPLE

A method for producing an electrode assembly according to this application example includes a first step of forming a molded body containing an active material, a second step of dipping the molded body in a melt of a solid electrolyte in a first atmosphere, thereby impregnating the melt into voids inside the molded body, and a third step of cooling the molded body impregnated with the melt by moving the molded body to a second atmosphere whose temperature is lower than that of the first atmosphere, thereby combining the molded body with the solid electrolyte.

According to this application example, a melt of a solid electrolyte is impregnated into a porous molded body in a second step, and thereafter, the molded body is combined with the solid electrolyte by cooling in a third step. Therefore, as compared with a method in the related art in which a precursor solution of a solid electrolyte is impregnated into a porous molded body, followed by drying and then performing a heat treatment, thereby forming the solid electrolyte in a plurality of voids of the molded body, a thermal history time in the obtained electrode assembly can be shortened. That is, an electrode assembly having an excellent ion conductivity can be produced.

In the method for producing an electrode assembly according to the above application example, it is preferred that in the second step, an end portion of the molded body is dipped in the melt, and the melt is impregnated into the voids inside the molded body by capillary phenomenon.

According to this method, the melt of the solid electrolyte is impregnated into the molded body by capillary phenomenon, and therefore, the melt can be impregnated and filled regardless of the porosity of the molded body, so that the waste of the melt can be avoided.

In the method for producing an electrode assembly according to the above application example, it is preferred that in the third step, the molded body is cooled by being moved to the second atmosphere from the first atmosphere so that the temperature of the molded body decreases by 10° C. or more per minute.

According to this method, the solid electrolyte can be easily formed in the voids of the molded body by rapidly cooling the molded body impregnated with the melt of the solid electrolyte.

In the method for producing an electrode assembly according to the above application example, it is preferred that a gas for cooling is introduced into the second atmosphere.

According to this method, the molded body impregnated with the melt of the solid electrolyte can be efficiently cooled by introducing a gas for cooling into the second atmosphere. That is, the solid electrolyte can be efficiently formed in the voids of the molded body.

In the method for producing an electrode assembly according to the above application example, the molded body contains a lithium composite metal compound as the active material, the solid electrolyte is a compound containing Li, C, and B, and the gas for cooling contains $CO_2$.

According to this method, by containing $CO_2$ in the gas for cooling, decomposition of lithium (Li) and carbon (C) contained in the melt of the solid electrolyte is suppressed, and the decrease in the lithium ion conductivity due to desorption of carbon (C) from the formed solid electrolyte can be suppressed. That is, the lithium ion conductivity of the solid electrolyte can be ensured.

In the method for producing an electrode assembly according to the above application example, it is preferred that the solid electrolyte combined in the third step contains an amorphous phase.

According to this method, containing an amorphous phase in the solid electrolyte, as compared with the case where the solid electrolyte is crystalline, lithium ion conduction more smoothly takes place between the active materials. That is, an electrode assembly having a high ion conductivity can be produced.

In the method for producing an electrode assembly according to the above application example, it is preferred that the molded body has a porosity of 30% or more and 70% or less.

According to this method, the electric capacity and physical strength of the electrode assembly can be ensured.

Application Example

A method for producing lithium-ion battery, according to this application example includes a fourth step of forming a lithium reduction resistant layer on an electrode assembly produced using the method for producing an electrode assembly according to the above application example, a fifth step of forming a lithium metal layer on the lithium reduction resistant layer, and a sixth step of forming a current collector so as to be in contact with at least one of the electrode assembly and the lithium metal layer.

According to this application example, a lithium-ion battery having high capacity and an excellent charge-discharge characteristic can be produced.

In the method for producing a lithium-ion battery according to the above application example, the sixth step includes a bonding step of bonding a metal foil as the current collector to the molded body before the second step.

According to this method, a metal foil as the current collector is bonded to the molded body before the melt of the solid electrolyte is impregnated into the molded body, and therefore, the active material contained in the molded body and the metal foil can be reliably joined.

In the method for producing a lithium-ion battery according to this application example, the sixth step may include a surface treatment step of subjecting a surface on the opposite side to a surface, on which the lithium reduction resistant layer is formed, of the electrode assembly to a surface treatment, thereby exposing the active material after the third step.

According to this method, after the solid electrolyte is formed in a plurality of voids of the molded body, the surface treatment is performed to expose the active material, and therefore, the exposed active material and the current collector can be reliably joined.

DESCRIPTION OF EMBODIMENTS

Hereinafter, embodiments embodying the invention will be described with reference to the drawings. Incidentally, the drawings to be used are displayed by being appropriately enlarged or reduced in size so that portions to be described are in a recognizable state.

First Embodiment

Figure 1:
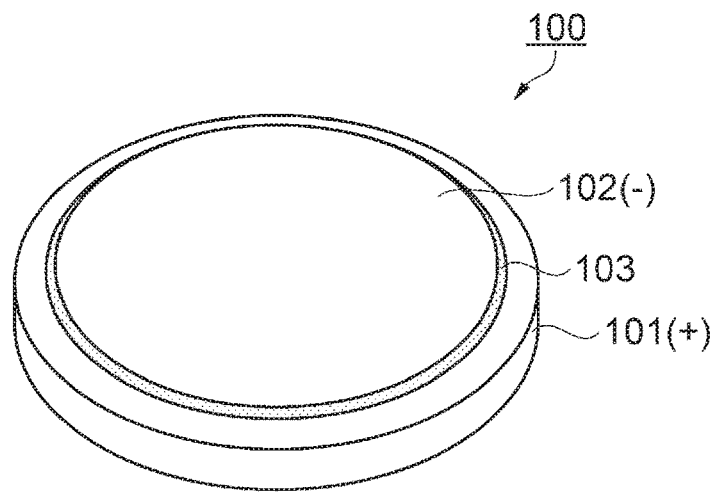
FIG. 1 is a schematic perspective view showing a coin type battery.

First, as a lithium-ion battery to which an electrode assembly of this embodiment is applied, a coin type battery will be exemplified and described with reference to FIGS. 1 and 2. FIG. 1 is a schematic perspective view showing the coin type battery, and FIG. 2 is a schematic cross-sectional view showing a structure of the coin type battery.

As shown in FIG. 1, a coin type battery 100 of this embodiment is in the form of a disk whose thickness is smaller than the outer diameter, and is configured to include a case 101, which functions as a positive electrode terminal (+) and is composed of stainless steel or the like, and a lid portion 102, which is housed in the case 101 through an insulator 103, functions as a negative electrode terminal (−), and is similarly composed of stainless steel or the like.

Figure 2:
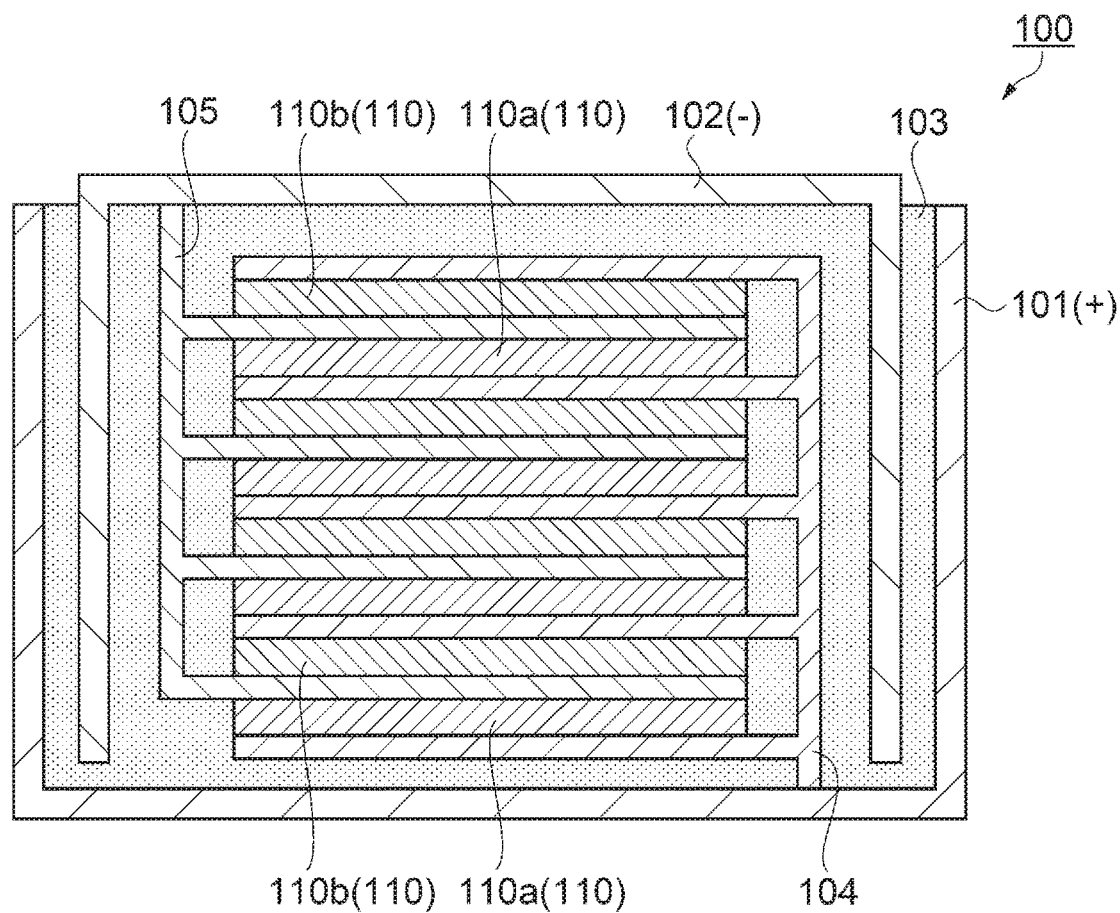
FIG. 2 is a schematic cross-sectional view showing a structure of the coin type battery.

As shown in FIG. 2, eight lithium-ion batteries 110 are housed inside the case 101 of the coin type battery 100. The eight lithium-ion batteries 110 are electrically connected in parallel to each other between the case 101 and the lid portion 102.

Specifically, a total of eight lithium-ion batteries 110a with the positive electrode side faced downward and lithium-ion batteries 110b with the negative electrode side faced downward are alternately housed in the case 101 in the form of a cylinder. A negative electrode connecting portion 105 is inserted between the lithium-ion battery 110a and the lithium-ion battery 110b housed thereabove. Further, a positive electrode connecting portion 104 is inserted between the lithium-ion battery 110b and the lithium-ion battery 110a housed thereabove. In other words, the positive electrode connecting portion 104, the lithium-ion battery 110a, the negative electrode connecting portion 105, the lithium-ion battery 110b, and the positive electrode connecting portion 104 are sequentially stacked, and a total of eight lithium-ion batteries 110 are electrically connected in parallel to each other.

A lower end-portion of the positive electrode connecting portion 104 is connected to the case 101 which functions as a positive electrode terminal (+). An upper end portion of the negative electrode connecting portion 105 is connected to the lid portion 102 which functions as a negative electrode terminal (−). The lid portion 102 also is in the form of a cylinder and is housed in the case 101 through the insulator 103 so that the eight lithium-ion batteries 110, the positive electrode connecting portion 104, and the negative electrode connecting portion 105 are included and hermetically sealed.

The planar shape of the lithium-ion battery 110 is a circle and the size thereof is, for example, from φ3 mm to φ30 mm. The thickness of the lithium-ion battery 110 is, for example, from 100 μm to 150 μm (micrometers).

The configuration of the coin type battery 100 is not limited thereto, and the number of lithium-ion batteries 110 housed, in the case 101 or the connection method can be arbitrarily set. For example, it may be configured such that the case 101 is made to function as a negative electrode terminal (−) and the lid portion 102 is made to function as a positive electrode terminal (+) by changing the method for housing the lithium-ion batteries 110.

<Lithium-Ion Battery>

Figure 3:
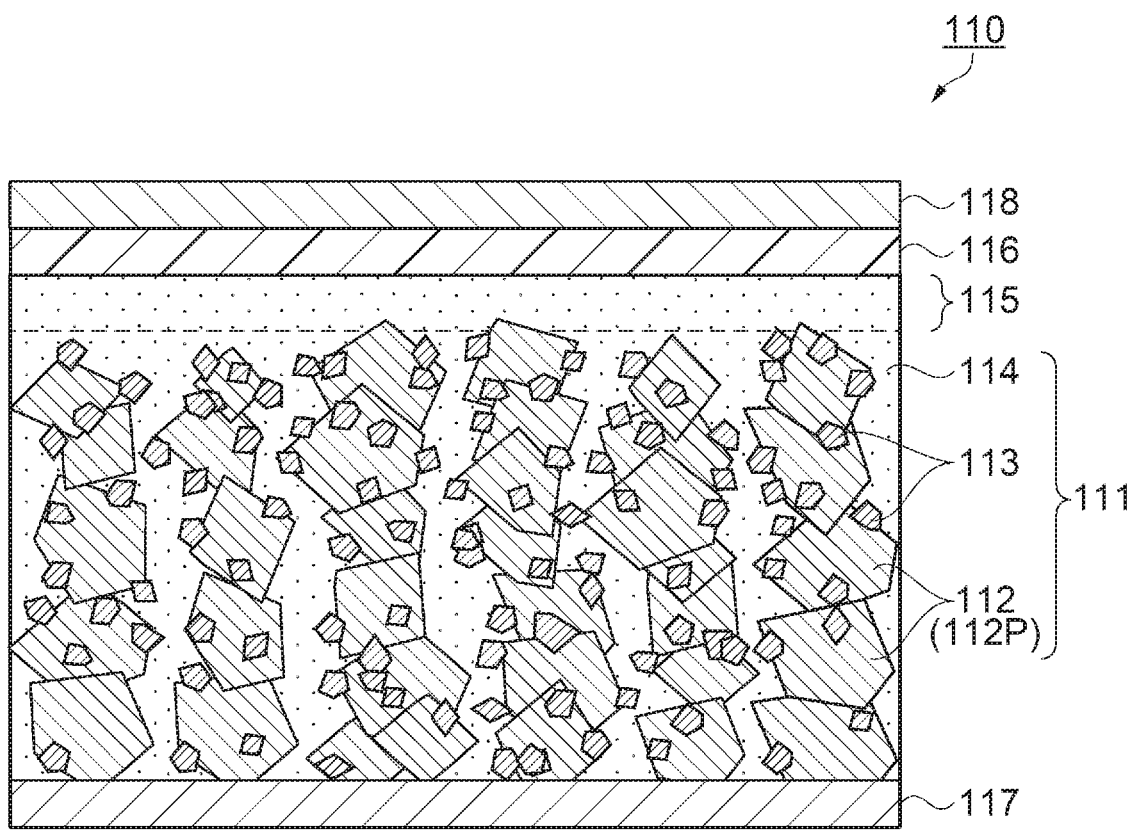
FIG. 3 is a schematic cross-sectional view showing a structure of a lithium-ion battery.

Next, the structure of the lithium-ion battery 110 according to this embodiment will be described with reference to FIG. 3. FIG. 3 is a schematic cross-sectional view showing the structure of the lithium-ion battery.

As shown in FIG. 3, the lithium-ion battery 110 of this embodiment includes an electrode assembly 111, and a lithium reduction resistant layer 115 and a lithium metal layer 116 stacked on the electrode assembly 111. Further, it includes a current collector 117 in contact with the electrode assembly 111, and a current collector 118 in contact with the lithium metal layer 116. The electrode assembly 111 functions as a positive electrode and an electrolyte, and the lithium metal layer 116 functions as a negative electrode.

The electrode assembly 111 is obtained by combining a positive electrode active material 112, a first solid electrolyte 113, and a second solid electrolyte 114. Hereinafter, the respective configurations of the lithium-ion battery 110 will be specifically described.

The positive electrode active material 112 in the electrode assembly 111 is a lithium composite metal compound containing two or more types of metals including lithium, and examples thereof include lithium composite oxides such as $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, other than such lithium composite oxides, a lithium composite fluoride such as $LiFeF_3$ may be used. Moreover, those obtained by substituting some of the atoms of these lithium composite metal compounds with another transition metal, typical metal, alkali metal, alkaline rare earth element, lanthanoid, chalcogenide, halogen, or the like are also included. Further, solid solutions of these lithium composite metal compounds may be used as the positive electrode active material 112.

In this embodiment, the positive electrode active material 112 is in the form of particles within a predetermined particle diameter range, and a plurality of particles gather to form a porous molded body 112P, and the molded body 112P has voids inside. The positive electrode active material 112 forming the voids is in a state where the first solid electrolyte 113 and the second solid electrolyte 114 are in contact with the surface thereof.

As the first solid electrolyte 113 in the electrode assembly 111, for example, an oxide, a sulfide, a halide, or a nitride is used. Specifically, as the first solid electrolyte 113, at least one of $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $L_{3.6}V_{0.4}Ge_{0.6}O_4$, $Li_{1.3}Ti_{1.7}Al_{0.3}(PO_4)_3$, $Li_{2.88}PO_{3.73}N_{0.34}$, $LiNbO_3$, $Li_{0.35}La_{0.55}TiO_3$, $Li_7La_3Zr_2O_{12}$, $Li_{6.75}La_3Zr_{1.75}Nb_{0.25}O_{12}$, $Li_2S$—$SiS_2$, $Li_2S$—$SiS_2$—$LiI$, $Li_2S$—$SiS_2$—$P_2S_5$, LiPON, $Li_3N$, LiI, LiI—$CaI_2$, LiI—CaO, $LiAlCl_4$, $LiAlF_4$, LiI—$Al_2O_3$, $LiFAl_2O_3$, LiBr—$Al_2O_3$, $Li_2O$—$TiO_2$, $La_2O_3$—$Li_2O$—$TiO_2$, $Li_3N$, $Li_3NI_2$, $Li_3N$—LiI—LiOH, $Li_3N$—LiCl, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, $LiSiO_4$—$Li_4ZrO_4$, $LiBH_4$, $Li_{7-x}PS_{6-x}Cl_x$, and $Li_{10}GeP_2S_{12}$ is used. The first solid electrolyte 113 may be crystalline or noncrystalline (amorphous). Further, solid solutions obtained by substituting some of the atoms of these compositions with another transition metal, typical metal, alkali metal, alkaline rare earth element, lanthanoid, chalcogenide, halogen, or the like may be used as the first solid electrolyte 113.

From the viewpoint of increasing the capacity of the lithium-ion battery 110, the ion conductivity of the first solid electrolyte 113 is preferably $1.0 \times 10^{-5}$ S/cm or more. When the ion conductivity is low, only the positive electrode active material 112 in the vicinity of the lithium metal layer (negative electrode) 116 contributes to a battery reaction, and the ions of the first solid electrolyte 113 cannot be effectively utilized, and therefore, the capacity of the lithium-ion battery 110 is also not increased. When the ion conductivity becomes high, also ions contained in the positive electrode active material 112 located apart from the lithium metal layer (negative electrode) 116 reach the lithium metal layer (negative electrode) 116 through the first solid electrolyte 113, the second solid electrolyte 114, and the lithium reduction resistant layer 115 and can contribute to a battery reaction. That is, by including the first solid electrolyte 113 having a high ion conductivity, the utilization rate of the positive electrode active material 112 in the electrode assembly 111 is improved, and the capacity of the lithium-ion battery 110 can be increased.

Here, the ion conductivity of the solid electrolyte refers to a total ion conductivity which is the sum of a bulk conductivity which is the conductivity of the inorganic electrolyte itself and a grain boundary ion conductivity which is a conductivity between crystal grains in the case where the inorganic electrolyte is crystalline.

The ion conductivity of the solid electrolyte is measured by, for example, an AC impedance method. The measurement is performed, for example, using a sample obtained by forming an electrode on both surfaces of the solid electrolyte molded into a predetermined form (for example, a tablet form). More specifically, a solid electrolyte powder is press-molded into a tablet form at 624 MPa. The press-molded body is sintered at 700° C. for 8 hours in an air atmosphere. On the sintered body, a metal (for example, platinum) in a predetermined form (which is, for example, a circle with a diameter of 0.5 cm and has a thickness of 100 nm) is formed by sputtering. The measurement is performed, for example, using an impedance analyzer (SI 1260, manufactured by Solartron, Inc.).

As the second solid electrolyte 114 in the electrode assembly 111, a material which conducts lithium ions and is noncrystalline (glassy or amorphous) at room temperature, and examples thereof include $Li_3BO_3$, $Li_3BO_3$—$Li_4SiO_4$, $Li_3BO_3$—$Li_3PO_4$, $Li_3BO_3$—$Li_2SO_4$, and $L_2CO_4$—$Li_3BO_3$.

$Li_3BO_3$ has an ion conductivity of about $6.0\times10^{-8}$ S/cm and a melting point of about 800° C. $Li_3BO_3$—$Li_4SiO_4$ has an ion conductivity of about $4.0\times10^{-6}$ S/cm and a melting point of about 720° C. $Li_3BO_3$—$Li_3PO_4$ has an ion conductivity of about $1.0\times10^{-7}$ S/cm and a melting point of about 850° C. $Li_3BO_3$—$Li_2SO_4$ has an ion conductivity of about $1.0\times10^{-6}$ S/cm and a melting point of about 700° C. $Li_{2.2}C_{0.8}B_{0.2}O_3$ (hereinafter abbreviated and referred to as "LCBO") which is a $Li_2CO_3$—$Li_3BO_3$-based compound has an ion conductivity of about $8.0\times10^{-7}$ S/cm and a melting point of about 685° C.

The thickness of the electrode assembly 111 is designed according to the capacity of the lithium-ion battery 110. The thickness of the electrode assembly 111 is, for example, from 80 μm to 300 μm, preferably 100 μm or more.

A region which does not contain the positive electrode active material 112 and the first solid electrolyte 113 is provided between the electrode assembly 111 and the lithium metal layer 116. The region is the lithium reduction resistant layer 115. As the lithium reduction resistant layer 115, the same material as that of the second solid electrolyte 114 is basically used. By providing the lithium reduction resistant layer 115 which does not contain the positive electrode active material 112 in this manner, a short circuit between the lithium metal layer 116 which functions as a negative electrode and the current collector 117 through the molded body 112P composed of the positive electrode active material 112 can be prevented.

The current collectors 117 and 118 are electrodes for taking out an electric current generated by a battery reaction. The current collector 117 is particularly disposed so as to be in contact with the molded body 112² composed of the positive electrode active material 112 in the electrode assembly 111. The current collector 118 is disposed so as to be in contact with the lithium metal layer 116.

The current collectors 117 and 118 are formed using one type of metal simple substance selected from the group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy containing two or more types of metals selected from this group, an electrically conductive metal oxide such as ITO, ATO, or FTO, a metal nitride such as TiN, ZrN, or TaN, or the like. The shape of the current collectors 117 and 118 is, for example, a plate-like shape, a foil-like shape, or a net-like shape. The surface of the current collectors 117 and 118 may be smooth or may have irregularities formed thereon.

As described above, the molded body 112P composed of the positive electrode active material 112 is porous and has a plurality of voids (pores) inside. These voids communicate with one another inside the molded body 112P.

The porosity of the molded body 112P is preferably 10% or more and 70% or less, more preferably 30% or more and 70% or less. By controlling the porosity so as to increase the contact area between the molded body 112P and the first solid electrolyte 113 or the second solid electrolyte 114, the capacity of the lithium-ion battery 110 can be further increased.

The porosity $r_v$ can be determined according to the following formula (1).

[Math. 1]

$$r_v = \left(1 - \frac{m}{Vg \cdot \rho}\right) \times 100 \quad (1)$$

Here, Vg denotes the apparent volume of the molded body 112P. The apparent volume is calculated from the outer dimension of the molded body 112P and includes the voids. m denotes the mass of the molded body 112P, and ρ denotes the density of the positive electrode active material 112 constituting the molded body 112P. As will be described in detail later, the porosity $r_v$ of the molded body 112P can be controlled in a step of forming the molded body 112P.

From the viewpoint of increasing the output of the lithium-ion battery 110, the resistivity of the molded body 112P is preferably 700 Ω·cm or less. The resistivity is obtained by, for example, DC polarization measurement. In the DC polarization measurement, for example, a copper foil is bonded to the surface of the molded body 112P, and this copper foil is used as an electrode.

In the voids of the molded body 112P, the first solid electrolyte 113 and the second solid electrolyte 114 are filled and in contact with the positive electrode active material 112. The filling ratio of the first solid electrolyte 113 and the second solid electrolyte 114 with respect to the voids of the molded body 112P is preferably higher, but for example, 60% or more and 99.9% or less.

In the molded body 112P, the plurality of voids communicate with one another in a mesh form inside. For example, $LiCoO_2$, which is one example of the positive electrode active material 112, is known to have anisotropy in the electron conduction property in a crystal. Due to this, in the case where voids extend in a specific direction, a state where electron conduction hardly takes place may be brought about depending on the relationship between the direction in which the voids extend and the crystal orientation. In this embodiment, the voids of the molded body 112P communicate with one another in a mesh form, and the positive electrode active materials 112 are also isotropically connected to one another. Therefore, an electrochemically smooth continuous surface of the positive electrode active material 112 can be formed, and favorable electron conduction can be obtained as compared with the case where voids are anisotropically formed.

Further, the molded body 112P has many voids inside, and therefore has a large surface area. Because of this, the contact area between the molded body 112P and the first solid electrolyte 113 or the second solid electrolyte 114 is increased, and thus, the interfacial impedance can be decreased. Incidentally, in the electrode assembly 111, the contact area between the molded body 112P and the second solid electrolyte 114 is larger than the contact area between the current collector 117 and the molded body 112P. Charge transfer takes place more easily at the interface between the current collector 117 and the molded body 112P than at the interface between the molded body 112P and the second solid electrolyte 114, and therefore, when these contact areas are comparable, the interface between the molded body 112P and the second solid electrolyte 114 becomes the bottleneck of charge transfer. In this embodiment, the contact area between the molded body 112P and the second solid electrolyte 114 is larger, and thus, this bottleneck is easily eliminated.

<Method for Producing Lithium-Ion Battery>

Figure 4:
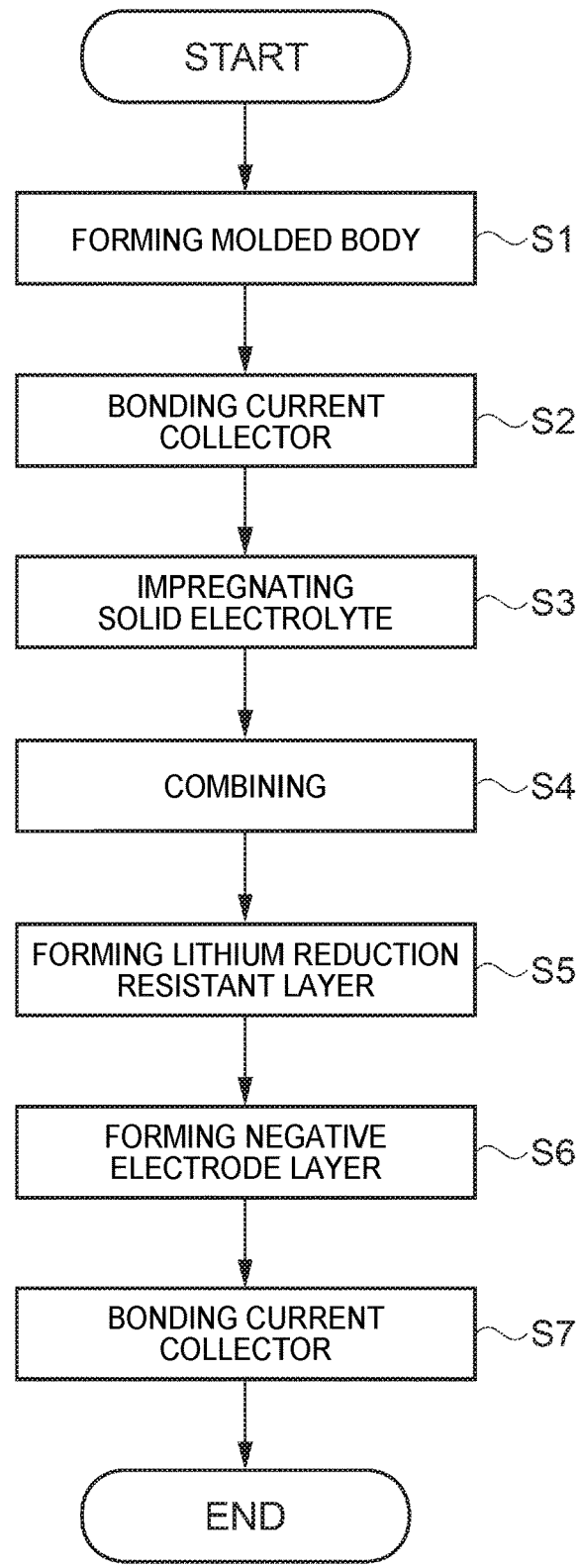
FIG. 4 is a flowchart showing a method for producing a lithium-ion battery of a first embodiment.
Figure 8:
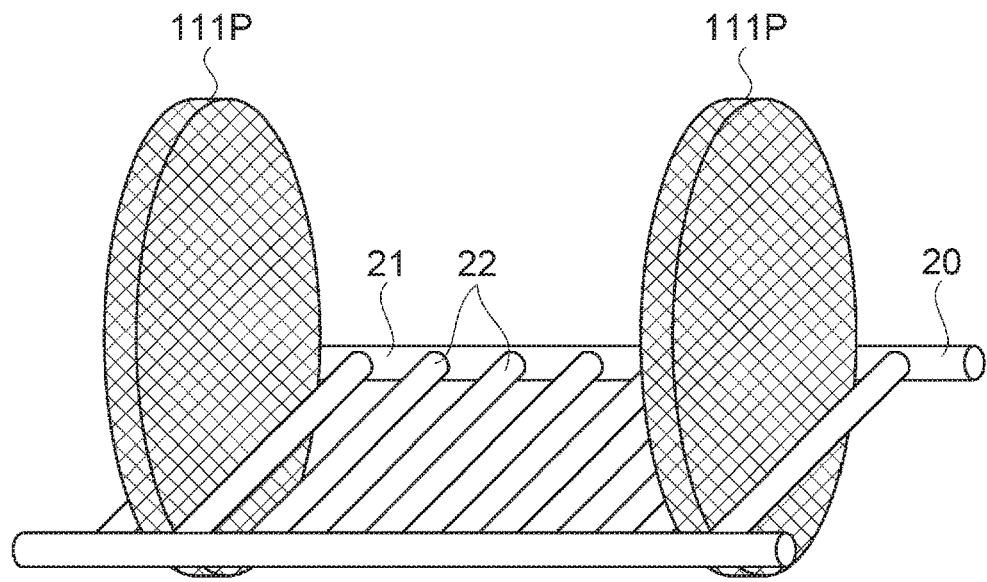
FIG. 8 is a schematic perspective view showing a tool for dipping a molded body.
Figure 9:
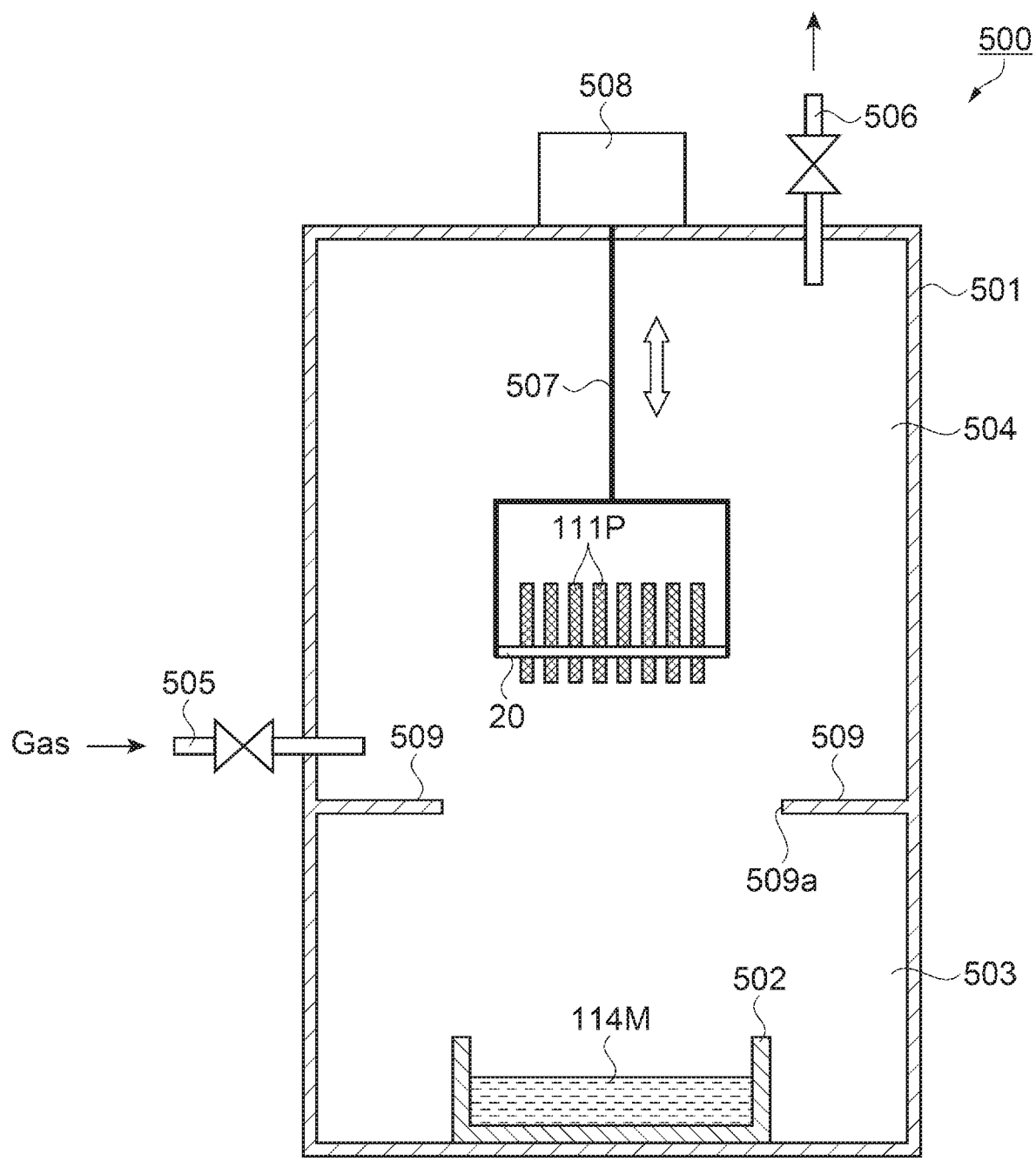
FIG. 9 is a schematic view showing a device for dipping a molded body.

Next, a method for producing the lithium-ion battery 110 to which a method for producing an electrode assembly of this embodiment is applied will be described with reference to FIGS. 4 to 13. FIG. 4 is a flowchart showing the method for producing the lithium-ion battery, FIGS. 5 to 7 and FIGS. 10 to 13 are schematic cross-sectional views showing the method for producing the lithium-ion battery, FIG. 8 is a schematic perspective view showing a tool for dipping the molded body, and FIG. 9 is a schematic view showing a device for dipping the molded body.

As shown in FIG. 4, the method for producing the lithium-ion battery 110 of this embodiment includes a molded body forming step (step S1), a current collector bonding step (step S2), a solid electrolyte impregnating step (step S3), a combining step (step S4), a lithium reduction resistant layer forming step (step S5), a negative electrode layer forming step (step S6), and a current collector bonding step (step S7).

In the molded body forming step of the step S1, a porous molded body 112P composed of a positive electrode active material 112 is formed. Specifically, first, a positive electrode active material ingredient (a lithium composite metal compound) in the form of particles (powder) is prepared. In this embodiment, $LiCoO_2$ (hereinafter abbreviated and referred to as "LCO") was used as the positive electrode active material ingredient. The average particle diameter (D50) of the positive electrode active material ingredient is, for example, preferably 300 nm or more and 20 µm or less, more preferably 5 µm or more and 15 µm or less. The average particle diameter is measured, for example, using a light scattering particle size distribution analyzer (for example, Nanotrac UPA-EX250, manufactured by Nikkiso Co., Ltd.) after dispersing the positive electrode active material ingredient in the form of particles in n-octanol at a concentration of 0.1 mass % to 10 mass %. When the average particle diameter is too small, the voids become smaller, and it becomes difficult to fill the voids with the solid electrolyte in the subsequent step. On the other hand, when the average particle diameter is too large, the specific surface area of the molded body 112P becomes smaller, and the output of the lithium-ion battery 110 is decreased.

Figure 5:
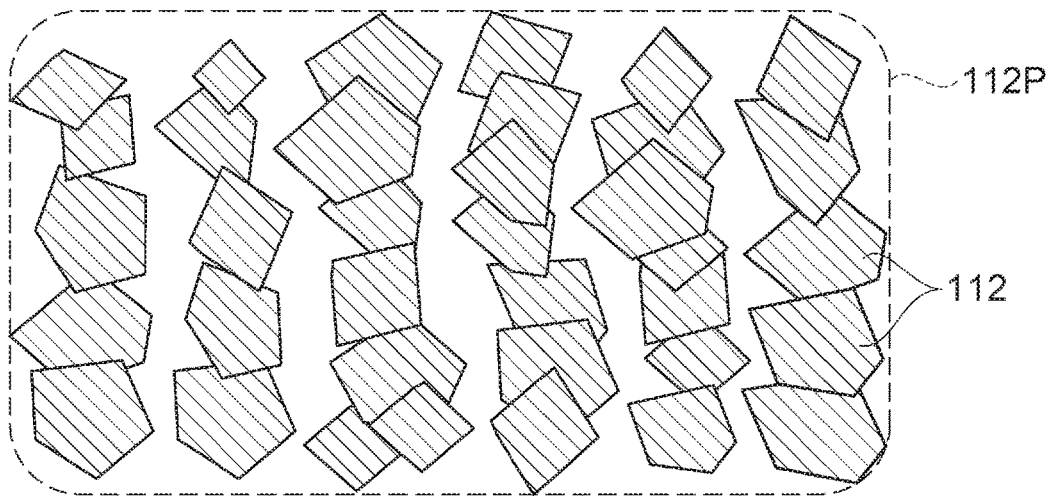
FIG. 5 is a schematic cross-sectional view showing the method for producing a lithium-ion battery of the first embodiment.

Subsequently, the positive electrode active material ingredient in the form of particles as placed in a mold and compression-molded by pressing at a pressure of, for example, 0.1 MPa to 5.0 MPa. Further, this compressed body is sintered by a heat treatment, whereby the molded body 112P shown in FIG. 5 is obtained. This heat treatment is performed under a temperature condition which is 850° C. or higher and lower than the temperature which is the lower of either the melting point or the decomposition point of the lithium composite metal compound to be used as the positive electrode active material ingredient in consideration of the evaporation of Li. The melting point of LCO as the lithium composite metal compound is 1000° C. or higher, and therefore, this heat treatment is preferably performed at 900° C. or higher and 1000° C. or lower, more preferably performed at 925° C. or higher and 975° C. or lower. Further, this heat treatment is preferably performed for 5 minutes or more and 36 hours or less, more preferably performed for 4 hours or more and 14 hours or less.

Incidentally, to the positive electrode active material ingredient, a polymer compound which functions as a binder may be added. Examples of such a polymer compound include polyvinylidene fluoride (PVdF), polyvinyl alcohol (PVA), and polypropylene carbonate (PPC). These polymer compounds are burned or oxidized in the heat treatment in this step, and the amount thereof is reduced or disappeared.

Further, to the positive electrode active material ingredient, a pore forming material may be added. The pore forming material refers to a material (for example, a polymer compound or a carbon powder) to serve as the template of the void. By adding the pore forming material, the porosity of the molded body 112P can be controlled. The pore forming material is burned or oxidized in the heat treatment in this step, and the amount thereof is reduced. The average particle diameter of the pore forming material is preferably from 0.5 µm to 10 µm. The pore forming material may contain particles composed of a deliquescent material. When the particles deliquesce, water generated around the particles functions as a binder for binding the lithium composite metal compound in the form of particles. Therefore, it becomes possible to maintain the shape of the compressed body from when the positive electrode active material ingredient in the form of particles is compression-molded until when the heat treatment is performed.

Subsequently, a first solid electrolyte 113 is formed so as to be in contact with the surface of the positive electrode active material 112 in the voids inside the molded body 112P. Specifically, first, a precursor of the first solid electrolyte 113 is prepared. As the precursor, for example, any of the following (A) to (C) is used.

(A) a composition including a salt which contains metal atoms at a ratio according to the composition of the first solid electrolyte 113, and is converted into the first solid electrolyte 113 by oxidation (B) a composition including a metal alkoxide which contains metal atoms at a ratio according to the composition of the first solid electrolyte 113

(C) a dispersion liquid in which the first solid electrolyte 113 in the form of fine particles or a sol in the form of fine particles containing metal atoms at a ratio according to the composition of the first solid electrolyte 113 is dispersed in a solvent, or in (A) or (B)

The salt to be contained in (A) includes a metal complex. Further, (B) is a precursor when the first solid electrolyte 113 is formed using a so-called sol-gel method.

In this embodiment, as the first solid electrolyte 113 which exhibits a higher ion conductivity than the second solid electrolyte 114, $Li_{6.75}La_3Zr_{1.75}Nb_{0.25}O_{12}$ (hereinafter abbreviated and referred to as "LLZrNbO") was used. The crystal grains of LLZrNbO are dispersed in a solvent and the resulting solution is used as a precursor solution 113S. The average particle diameter of LLZrNbO is, for example, from 300 nm to 20 µm. Incidentally, melting point of LLZrNbO is from about 1000° C. to 1100° C.

Figure 6:
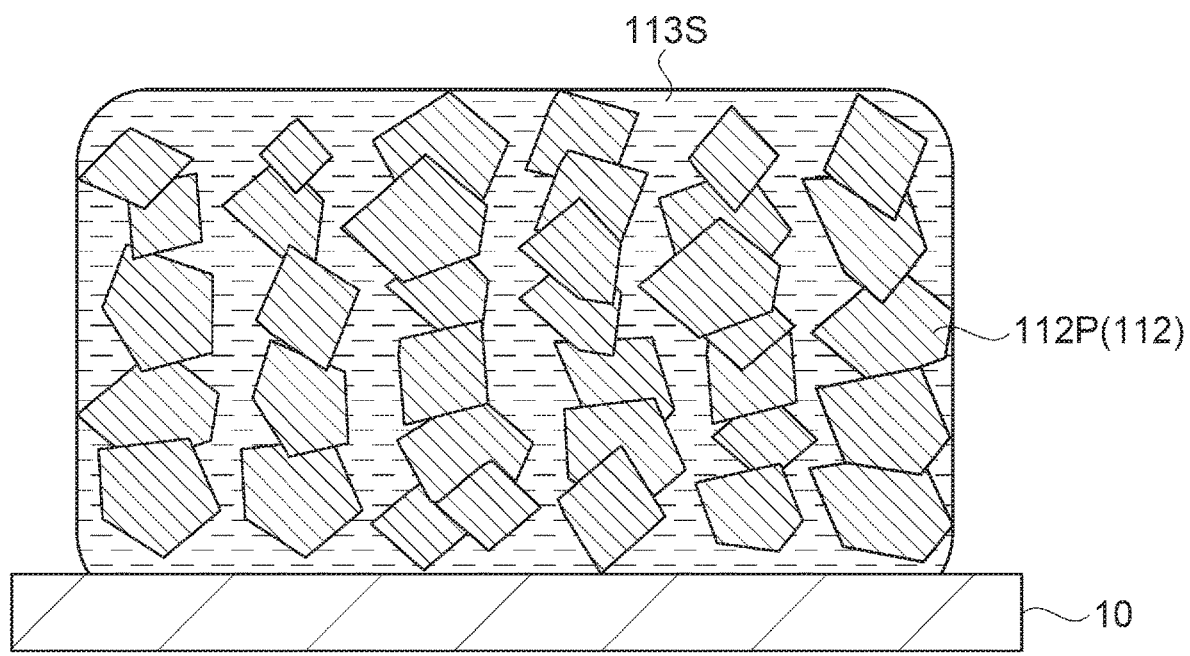
FIG. 6 is a schematic cross-sectional view showing the method for producing a lithium-ion battery of the first embodiment.

Subsequently, as shown in FIG. 6, the precursor solution 113S is impregnated (allowed to soak) into the voids of the molded body 112P. Specifically, for example, the precursor solution 113S is dropped onto the molded body 112P placed on a substrate 10. Alternatively, the molded body 112P may be immersed in the precursor solution 113S. In another example, the precursor solution 113S may be applied to the molded body 112P. In still another example, the precursor solution 113S may be brought into contact with an end portion of the molded body 112P so as to impregnate the precursor solution 113S into the voids of the molded body 112P by utilizing capillary phenomenon. At this time, the impregnation of the precursor solution 113S may be accelerated by pressurizing the atmosphere or the precursor surrounding the molded body 112P. The substrate 10 is, for example, a transparent quartz substrate which is hardly deformed or the like even if firing is performed at a high temperature thereafter.

Subsequently, the molded body 112P impregnated with the precursor solution 113S is fired, whereby the first solid electrolyte 113 is deposited in the voids of the molded body 112P. The solvent may be removed before firing. The removal of the solvent is performed using at least one generally known method such as heating, decompression, or air-blowing. The firing is performed in an air atmosphere at a temperature lower than that of the heat treatment for obtaining the molded body 112P. The firing temperature is, for example, in a temperature range of 500° C. or higher and 900° C. or lower. When the firing temperature is too high, an electrochemically inactive byproduct may sometimes be generated due to a solid phase reaction at the interface between the molded body 112P and the first solid electrolyte 113. Such a byproduct has an adverse effect on the characteristics of the lithium-ion battery 110. Further, when the firing temperature is too low, the crystallinity of the first solid electrolyte 113 is poor, and a sufficient ion conduction property may not sometimes be obtained.

The first solid electrolyte 113 is formed by a method in which the precursor solution 113S having fluidity is impregnated into the voids of the molded body 112P, however, it is difficult to impregnate the precursor solution 113 into all the voids. Further, the first solid electrolyte 113 is deposited in the voids by evaporating the solvent from the precursor solution 113S by firing, however, the voids still remain in a composite body 111P of the molded body 112P and the first solid electrolyte 113 (see FIG. 7). Then, the process proceeds to the step S2.

Incidentally, the step S1 is one example of the first step in the method for producing an electrode assembly of the invention.

Figure 7:
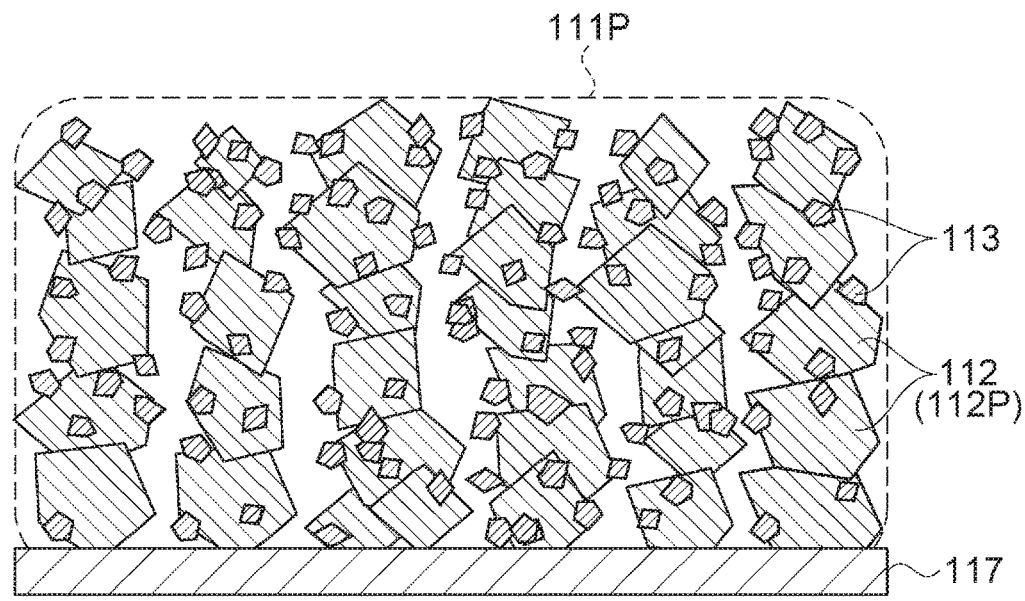
FIG. 7 is a schematic cross-sectional view showing the method for producing a lithium-ion battery of the first embodiment.

In the current collector bonding step of the step S2, as shown in FIG. 7, a current collector 117 is formed on the composite body 111P of the molded body 112P and the first solid electrolyte 113. In this embodiment, as the current collector 117, an Au foil having a thickness of about 1 µm to 20 µm was bonded to one surface of the composite body 111P, followed by pressing. Then, the process proceeds to the step S3. Incidentally, the step S2 is one example of the sixth step in the method for producing a lithium-ion battery of the invention.

In the solid electrolyte impregnating step of the step S3, the composite body 111P to which the current collector 117 is bonded is dipped in a melt of the second solid electrolyte 114 so as to impregnate and fill the melt into the voids of the composite body 111P by utilizing capillary phenomenon. Incidentally, the step S3 is one example of the second step in the method for producing an electrode assembly of the invention.

First, a dipping tool for dipping the composite body 111P in the melt of the second solid electrolyte 114 will be described with reference to FIG. 8. As shown in FIG. 8, a dipping tool 20 is in the form of a ladder and includes a pair of support pillars 21 disposed in parallel to each other and a plurality of support portions 22 laid at intervals between the pair of support pillars 21. When the dipping tool 20 in the form of a ladder is placed horizontally, and the composite body 111P in the form of a disk is inserted between the adjacent support portions 22, the composite body 111P can be supported in a state where an end portion of the composite body 111P protrudes from the lower side of the dipping tool 20. In the dipping tool 20 of this embodiment, a maximum of eight composite bodies 111P can be set. That is, the dipping tool 20 is configured to be able to set the same number of composite bodies 111P as that of lithium-ion batteries 110 to be housed in the coin type battery 100. Incidentally, the number of composite bodies 111P which can be set in the dipping tool 20 is not limited to eight.

Next, a dipping device using the dipping tool 20 will be described with reference to FIG. 9. As shown in FIG. 9, a dipping device 500 of this embodiment includes a chamber 501 in which the dipping tool 20 suspended inside can move in the vertical direction. The inside of the chamber 501 is partitioned in the vertical direction by a partition portion 509 into a dipping room 503 in which a melting furnace 502 is disposed in a bottom portion and a cooling room 504.

In the melting furnace 502, the second solid electrolyte 114 is placed and heated, whereby a molten melt 114M is stored.

In the cooling room 504, a suspending arm 507 for suspending the dipping tool 20 in an attachable and detachable manner is provided. Further, the suspending arm 507 vertically moves by a drive portion 508 provided on the upper side of the chamber 501. As a configuration for vertically moving the suspending arm 507, for example, a configuration in which a wire is attached to the upper end of the suspending arm 507 and the wire is wound and unwound by a driving system such as a motor included in the drive portion 508 is exemplified.

The partition portion 509 which partitions the dipping room 503 and the cooling room 504 from each other is provided with an opening portion 509a which opens on the upper side of the melting furnace 502. By the drive portion 508, the dipping tool 20 attached to the suspending arm 507 can be vertically moved between the dipping room 503 and the cooling room 504 through the opening portion 509a.

In a side portion close to the partition portion 509 of the cooling room 504, an introduction tube 505 for introducing a gas for cooling into the cooling room 504 is provided. Further, in an upper portion of the cooling room 504, a discharge tube 506 for discharging the introduced gas is provided. Each of the introduction tube 505 and the discharge tube 506 is provided with a valve for controlling the introduction or discharge of the gas.

The gas for cooling may be any as long as it is a dehumidified gas, and for example, dry air, an inert gas such as nitrogen, or the like can be used. Further, it is preferred to select a gas which hardly produces an unnecessary byproduct by a heating reaction according to the material of the second solid electrolyte 114 to be melted.

Next, the solid electrolyte impregnating step using the dipping device 500 will be described with reference to FIGS. 9 and 10. Incidentally, FIG. 10 shows the operation of dipping and cooling of one piece (sheet) of the composite body 111P.

Figure 10:
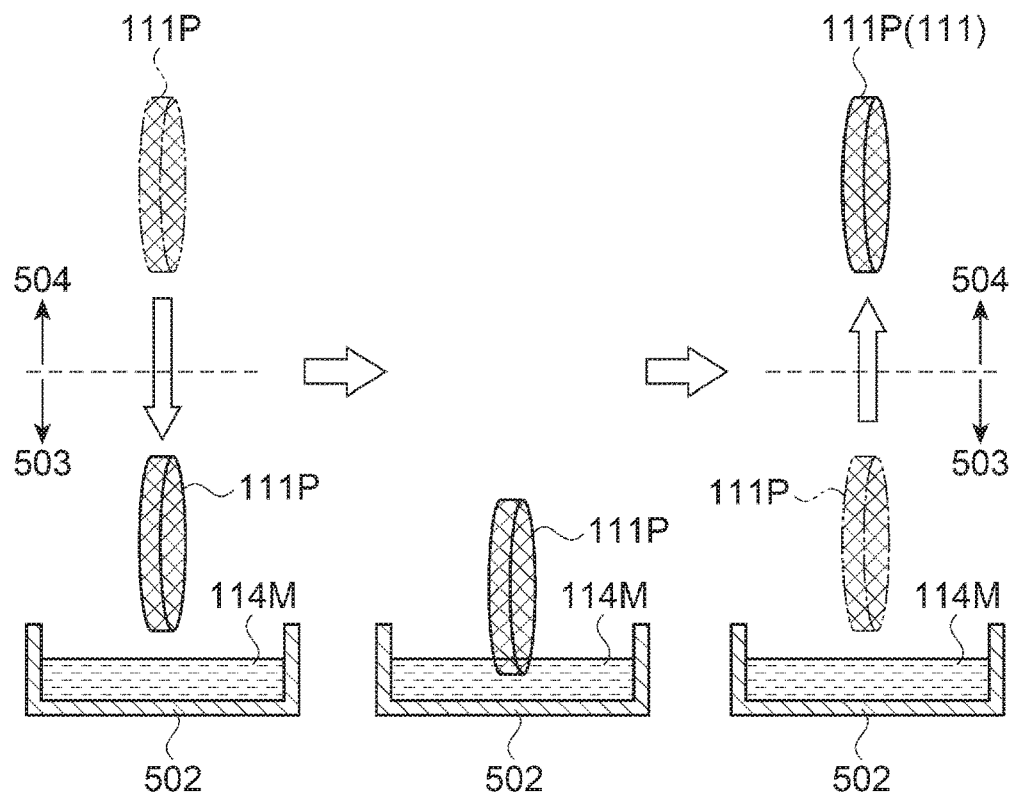
FIG. 10 is a schematic cross-sectional view showing the method for producing a lithium-ion battery of the first embodiment.

By the drive portion 508 shown in FIG. 9, the suspending arm 507 is lowered, and as shown in FIG. 10, the composite body 111P set in the dipping tool 20 is moved to the dipping room 503 from the cooling room 504. Then, the suspending arm 507 is stopped when the end portion of the composite body 111P is dipped in the melt 114M of the second solid electrolyte 114 stored in the melting furnace 502. Then, a state where the end portion of the composite body 111P is dipped in the melt 114M is maintained for a predetermined time. The composite body 111P porous, and therefore, the melt 114M is absorbed the composite body 111P by capillary phenomenon and filled in the voids inside the composite body 111P. After the predetermined time elapses, the suspending arm 507 is raised by the drive portion 508, and the composite body 111P set in the dipping tool 20 is pulled up to the cooling room 504 from the dipping room 503.

Incidentally, the predetermined time for dipping the end portion of the composite body 111P in the melt 114M depends on the volume and porosity of the composite body 111P. Therefore, the dipping time and the filling ratio of the second solid electrolyte 114 with respect to the voids after cooling are examined beforehand, and the time is set in consideration of a variation in the volume or porosity among the plurality of composite bodies 111P.

As described above, in the cooling room 504, a gas for cooling has been introduced, and by pulling up the composite body 111P to the cooling room 504 from the dipping room 503, the composite body 111P is cooled. That is, the inside of the dipping room 503 is one example of the first atmosphere in the invention, and the inside of the cooling room 504 is one example of the second atmosphere in the invention.

In this embodiment, LCBO having a relatively low melting point is used as the second solid electrolyte 114. Since the melting point of LCBO is 685° C., the temperature of the melt 114M the melting furnace 502 is 685° C. or higher and is maintained at, for example, about 700° C. Therefore, the temperature of the atmosphere in the dipping room 503 is, for example, from about 300° C. to 600° C. On the other hand, the temperature of the atmosphere in the cooling room 504 is adjusted to, for example, about 100° C. to 200° C. by introducing the gas for cooling from the introduction tube 505. Accordingly, the temperature difference between the atmosphere in the dipping room 503 and the atmosphere in the cooling room 504 is at most about 500° C.

Further, LCBO is used as the second solid electrolyte 114, and therefore, a gas containing $CO_2$ (carbon dioxide) is introduced into the cooling room 504 as the gas for cooling. By containing $CO_2$ in the gas for cooling, desorption of carbon from lithium carbonate ($Li_2CO_3$) contained in the melt 114M is suppressed, and therefore, the decrease in the ion conductivity of the second solid electrolyte 114 formed after cooling is suppressed.

Figure 11:
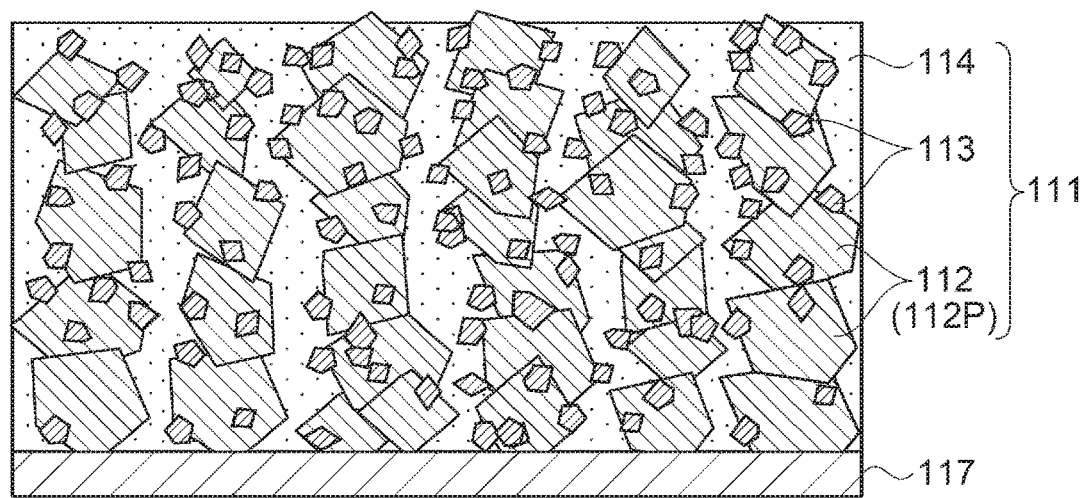
FIG. 11 is a schematic cross-sectional view showing the method for producing a lithium-ion battery of the first embodiment.

In this embodiment, when the composite body 111P in which the melt 114M is filled in the voids is pulled up to the cooling room 504 from the dipping room 503, the composite body 111P is pulled up so that the temperature of the composite body 111P decreases by 10° C. or more per minute. For example, when the temperature difference between the atmosphere in the dipping room 503 and the atmosphere in the cooling room 504 is 500° C., the composite body 111P is cooled by being pulled up to the cooling room 504 from the dipping room 503 within 50 minutes. For example, when the temperature difference between the atmosphere in the dipping room 503 and the atmosphere in the cooling room 504 is 300° C., the composite body 111P is cooled by being pulled up to the cooling room 504 from the dipping room 503 within 30 minutes. That is, the melt 114M filled in the voids of the composite body 111P is rapidly cooled at a predetermined rate to solidified the melt 114M, whereby the second solid electrolyte 114 is filled in the voids of the composite body 111P. That is, the composite body 111P and the second solid electrolyte 114 are combined (combining step (step S4)). By doing this, as shown in FIG. 11, the electrode assembly 111 in which the molded body 112P composed of the positive electrode active material 112, the first solid electrolyte 113, and the second solid electrolyte 114 are combined is formed. Then, the process proceeds to the step S5. Incidentally, the step S4 is one example of the third step in the method for producing an electrode assembly of the invention, and the steps S1 to S4 show the method for producing an electrode assembly.

Figure 12:
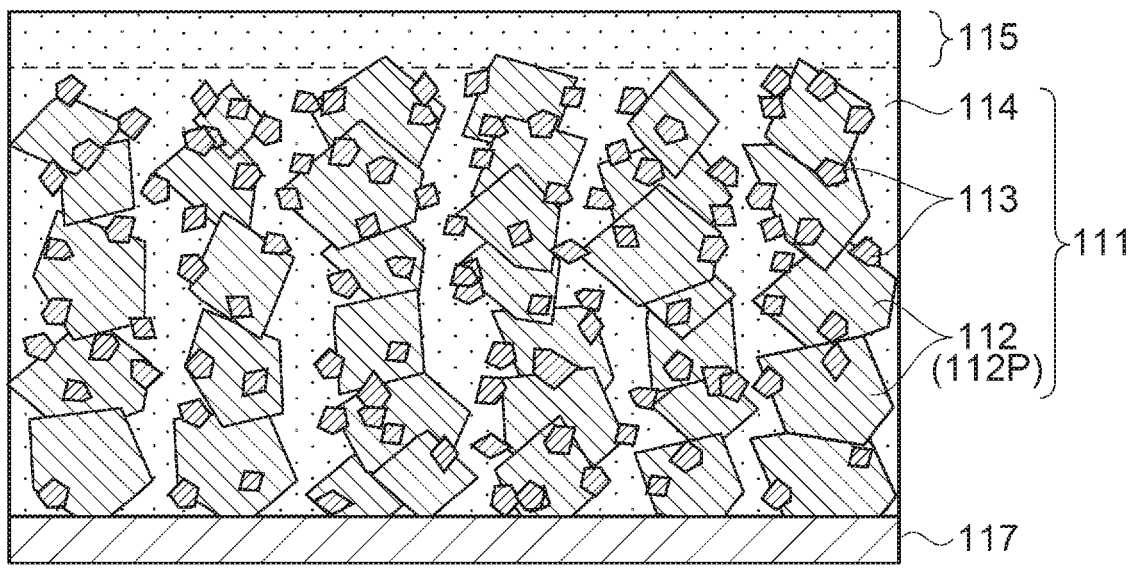
FIG. 12 is a schematic cross-sectional view showing the method for producing a lithium-ion battery of the first embodiment.

In the lithium reduction resistant layer forming step of the step S5, as shown in FIG. 12, a lithium reduction resistant layer 115 is formed on the surface on the opposite side to the surface, on which the current collector 117 is formed, of the electrode assembly 111. In this embodiment, the lithium reduction resistant layer 115 was formed by depositing LCBO which is the same material as that of the second solid electrolyte 114 to a film thickness of about 1 μm to 10 μm by a sputtering method. Then, the process proceeds to the step S6. Incidentally, the step S5 is one example of the fourth step in the method for producing a lithium-ion battery of the invention.

Figure 13:
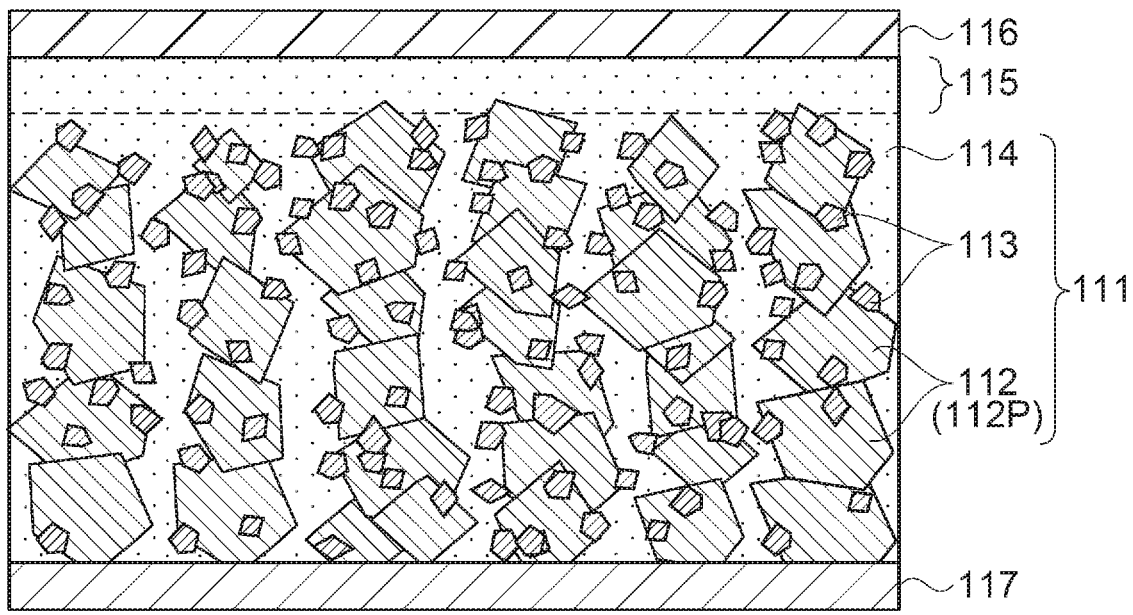
FIG. 13 is a schematic cross-sectional view showing the method for producing a lithium-ion battery of the first embodiment.

In the negative electrode layer forming step of the step S6, as shown in FIG. 13, a lithium metal layer 116 is formed so as to be in contact with the lithium reduction resistant layer 115. In this embodiment, the lithium metal layer 116 was formed by depositing Li to a film thickness of about 1 μm to 5 μm by a vapor deposition method. Then, the process proceeds to the step S7. Incidentally, the step S6 is one example of the fifth step in the method for producing a lithium-ion battery of the invention.

In the current collector bonding step of the step S7, as shown in FIG. 3, a current collector 118 is formed so as to be in contact with the lithium metal layer 116. In this embodiment, the current collector 118 was formed by bonding a Cu foil having a thickness of about 1 μm to 20 μm to the lithium metal layer 116, followed by pressing. Incidentally, the step S7 is one example of the sixth step in the method for producing a lithium-ion battery of the invention.

The feature of the method for producing the electrode assembly 111 of this embodiment resides in that the crystal grains of LCO having a melting point of 1000° C. or higher as the positive electrode active material 112 are press-molded, followed by sintering at a temperature of 850° C. or higher and 1000° C. or lower, thereby forming the molded body 112P. Further, from the viewpoint of realizing a high ion conductivity, the feature resides in that LLZrNbO having a melting point of about 1100° C. which is higher than that of LCO is used as the first solid electrolyte 113, the precursor solution 113S containing the crystal grains of LLZrNbO is impregnated into the voids of the molded body 112P, followed by a heat treatment at a temperature of 500° C. or higher and 900° C. or lower, thereby depositing the first solid electrolyte 113 in the voids. Further, the feature resides in that LCBO having a melting point of 685° C. which is lower than that of the positive electrode active material 112 is used as the second solid electrolyte 114, the melt 114M of LCBO is impregnated into the composite body 111P of the molded body 112P and the first solid electrolyte 113, followed by cooling, thereby filling the second solid electrolyte 114 in the voids of the composite body 111P. That is, the feature resides in that the positive electrode active material 112, the first solid electrolyte 113, and the second solid electrolyte 114 are combined at a heat treatment temperature which is lower than the melting point of the positive electrode active material 112, and a high ion conductivity and ensuring of the electric capacity are realized.

Incidentally, from the viewpoint of achieving the combining at a lower heat treatment temperature, the melting point or softening point of the second solid electrolyte 114 is preferably 400° C. or higher and 900° C. or lower.

According to the method for producing the electrode assembly 111 of the above-mentioned first embodiment, the following effects are obtained.

(1) The melt 114M of the second solid electrolyte 114 is impregnated into the composite body 111P as the porous molded body in the solid electrolyte impregnating step of the step S3, followed by cooling, thereby combining the composite body 111P and the second solid electrolyte 114 in the combining step of the step S4. Therefore, as compared with a method in which the precursor solution of the second solid electrolyte 114 is impregnated into the porous composite body 111P, followed by drying and then performing a heat treatment, thereby forming the second solid electrolyte 114 in the plurality of voids of the composite body 111P, a thermal history time in the obtained electrode assembly 111 can be shortened. That is, the electrode assembly 111 having an excellent ion conduction property can be efficiently produced. Further, by shortening the thermal history time, the deterioration of the electrical property of the electrode assembly 111 such as a decrease in electric capacity due to evaporation of Li in the process for producing the electrode assembly 111 can be suppressed.

(2) In the solid electrolyte impregnating step of the step S3, the melt 114M of the second solid electrolyte 114 is impregnated into the composite body 111P by capillary phenomenon, and therefore, the melt 114M can be impregnated and filled regardless of the porosity of the composite body 111P. Further, it is not necessary to precisely adjust the amount of the melt 114M according to the porosity, and therefore, the waste of the melt 114M can be avoided.

(3) In the combining step of the step S4, the composite body 111P impregnated with the melt 114M is pulled up to the cooling room 504 from the dipping room 503 so that the temperature of the composite body 111P decreases by 10° C. or more per minute, and therefore, the composite body 111P can be rapidly cooled. That is, as compared with the case where the composite body 111P impregnated with the melt 114M is slowly cooled, the melt 114M filled in the voids of the composite body 111P is hardly crystallized, and therefore, the second solid electrolyte 114 containing an amorphous phase can be formed. That is, as compared with the case where the second solid electrolyte 114 is crystalline, lithium ion conduction more smoothly takes place between the positive electrode active materials 112, and thus, the electrode assembly 111 exhibiting a high ion conductivity can be formed.

(4) In the dipping device 500, a gas for cooling is introduced into the cooling room 504, and therefore, the composite body 111P impregnated with the melt 114M can be efficiently cooled.

(5) The second solid electrolyte 114 is a compound (LCBO) containing Li, C, and B, and the gas for cooling contains $CO_2$, and therefore, desorption of carbon (C) from lithium carbonate ($Li_2CO_3$) contained in the melt 114M is suppressed, and thus, the decrease in the ion conductivity of the second solid electrolyte 114 formed after cooling can be suppressed. That is, a high ion conductivity can be ensured in the electrode assembly 111.

(6) The porosity of the molded body 112P composed of the positive electrode active material 112 is 10% or more and 70% or less, preferably 30% or more and 70% or less, and therefore, the specific surface area in the voids of the molded body 112P contributing to a battery reaction can be increased. Further, the strength of the electrode assembly 111 can be ensured while realizing a large specific surface area.

(7) According to the method for producing the lithium-ion battery 110 to which the method for producing the electrode assembly 111 of the above-mentioned first embodiment is applied, the electrode assembly 111 in which high ion conductivity and electric capacity are ensured is used, and therefore, the lithium-ion battery 110 which has high capacity and an excellent charge-discharge characteristic can be produced. Further, by housing a plurality of lithium-ion batteries 110, the coin type battery 100 which has high capacity and an excellent charge-discharge characteristic, and also is thin (small) can be provided.

(8) According to the method for producing the lithium-ion battery 110 to which the method for producing the electrode assembly 111 of the above-mentioned first embodiment is applied, the current collector 117 is bonded to the composite body 111P before the solid electrolyte impregnating step of impregnating the melt 114M of the second solid electrolyte 114 into the composite body 111P, and therefore, the Au foil as the current collector 117 and the positive electrode active material 112 are reliably brought into contact with each other, and the interfacial impedance between the current collector 117 and the electrode assembly 111 can be decreased. That is, the output loss of the lithium-ion battery 110 can be decreased.

Second Embodiment

Figure 14:
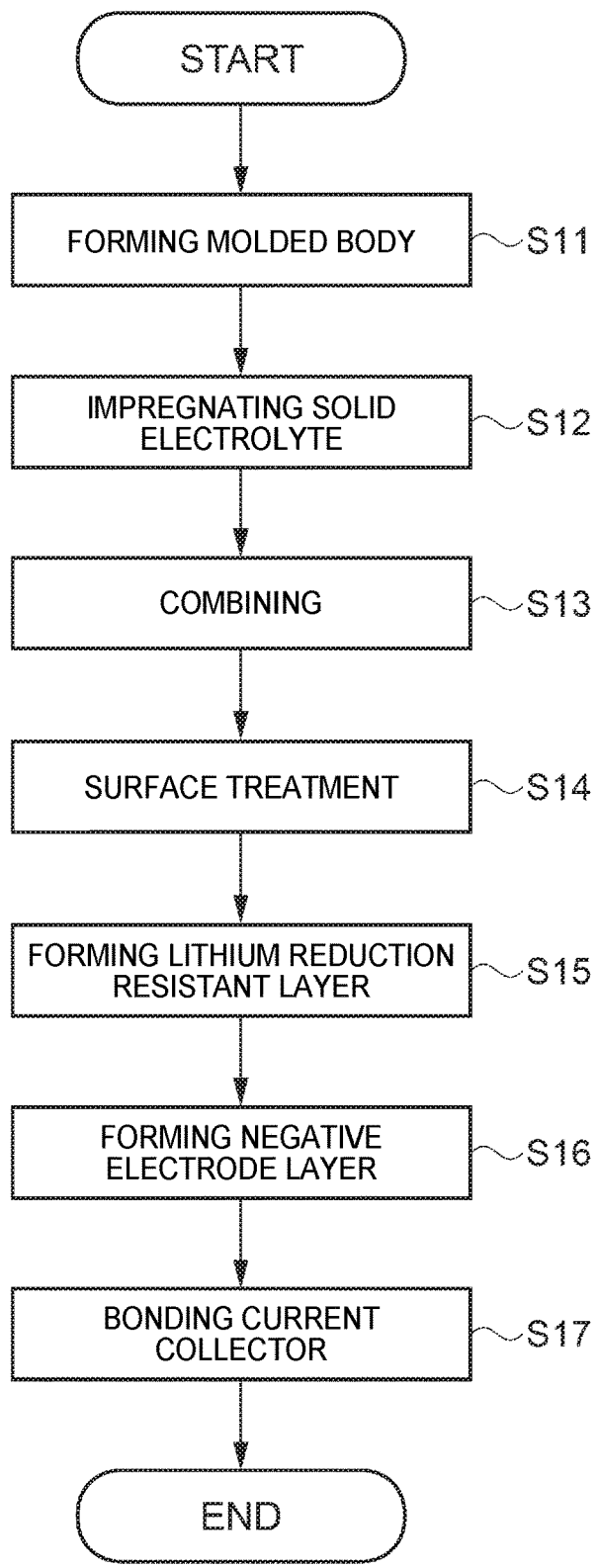
FIG. 14 is a flowchart showing a method for producing a lithium-ion battery of a second embodiment.
Figure 15:
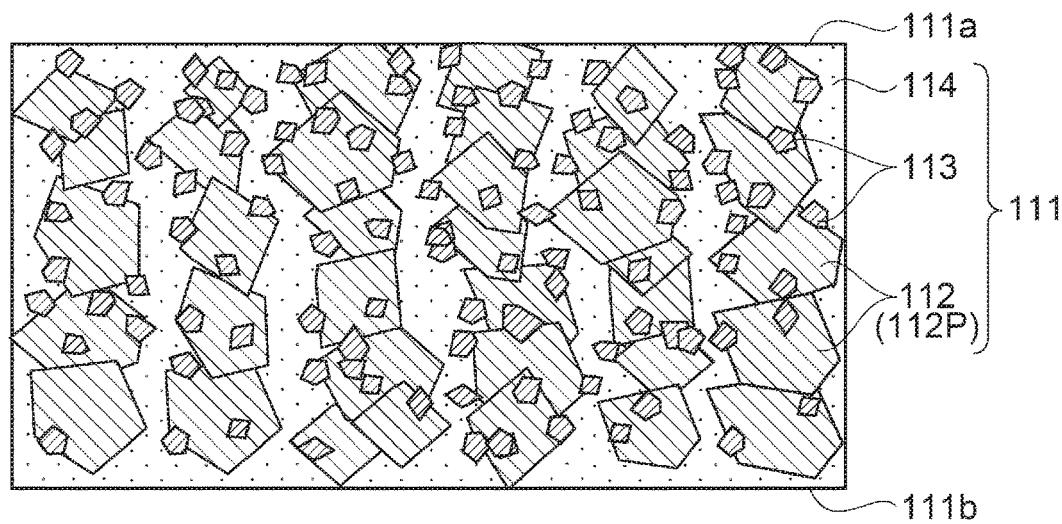
FIG. 15 is a schematic cross-sectional view showing the method for producing a lithium-ion battery of the second embodiment.
Figure 16:
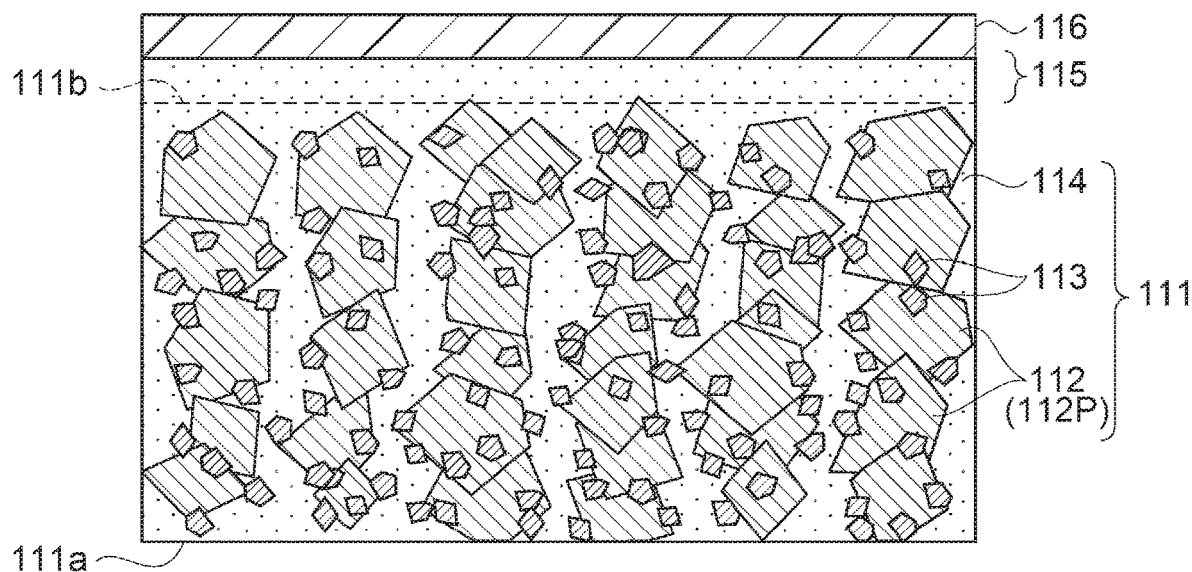
FIG. 16 is a schematic cross-sectional view showing the method for producing a lithium-ion battery of the second embodiment.
Figure 17:
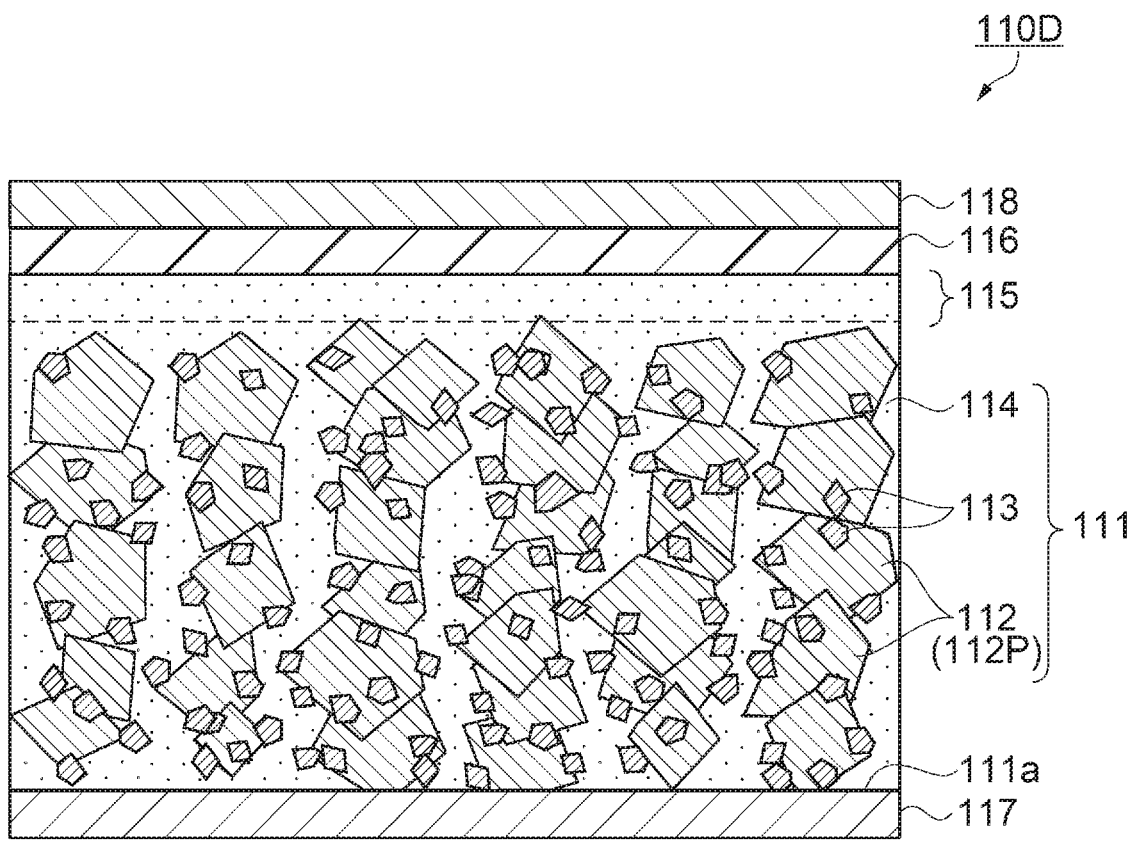
FIG. 17 is a schematic cross-sectional view showing the method for producing a lithium-ion battery of the second embodiment.

Next, a method for producing an electrode assembly of a second embodiment and a method for producing a lithium-ion battery to which this method is applied will be described with reference to FIGS. 14 to 17. FIG. 14 is a flowchart showing the method for producing a lithium-ion battery of the second embodiment, FIGS. 15 to 17 are schematic cross-sectional views showing the method for producing a lithium-ion battery of the second embodiment.

As shown in FIG. 14, the method for producing a lithium-ion battery to which the method for producing an electrode assembly of the second embodiment is applied includes a molded body forming step (step S11), a solid electrolyte impregnating step (step S12), a combining step (step S13), a surface treatment step (step S14), a lithium reduction resistant layer forming step (step S15), a negative electrode layer forming step (step S16), and a current collector bonding step (step S17).

The method for producing a lithium-ion battery of the second embodiment is configured such that the method for forming the current collector 117 is made different, and also a surface treatment step (step S14) is added with respect to the first embodiment.

The steps 811, 812, and 813 in the method for producing an electrode assembly of this embodiment are basically the same as the corresponding steps S1, S3, and S4 in the first embodiment. Further, the steps S15 and S16 in the method for producing a lithium-ion battery of this embodiment are basically the same as the corresponding steps S5 and S6 in the first embodiment. Therefore, the same components as those of the lithium-ion battery 110 of the first embodiment are denoted by the same reference numerals and a detailed description thereof will be omitted. Further, a description of the same steps as those of the first embodiment will be simplified, and different steps will be described in detail.

In the molded body forming step of the step S11, a composite body 111P in which a porous molded body 112P composed of a positive electrode active material 112 and a first solid electrolyte 113 are combined is formed in the same manner as the step S1 of the above-mentioned first embodiment. Then, the process proceeds to the step S12.

In the solid electrolyte impregnating step of the step S12 to the combining step of the step S13, a melt 114M of a second solid electrolyte 114 is impregnated into the composite body 111P in the same manner as the step S3 of the above-mentioned first embodiment without bonding a current collector 117 to the composite body 111P as in the step S2 of the above-mentioned first embodiment. Then, in the same manner as the step S4 of the above-mentioned first embodiment, the composite body 111P impregnated with the melt 114M is cooled by being pulled up to the cooling room 504 from the dipping room 503, whereby an electrode assembly 111 in which the composite body 111P and the second solid electrolyte 114 are combined is obtained. Then, the process proceeds to the step S14.

In the surface treatment step of the step S14, as shown in FIG. 15, one surface 111a between two surfaces 111a and 111b facing each other of the electrode assembly 111 is subjected to a surface treatment, thereby exposing the positive electrode active material 112. In this embodiment, one surface 111a was subjected to a chemical-mechanical-polishing treatment (CMP treatment) as the surface treatment. Therefore, one surface 111a is smoother than the other surface 111b, and also the positive electrode active material 112 is reliably exposed. Then, the process proceeds to the step S15.

Incidentally, the surface treatment method for exposing positive electrode active material 112 on one surface 111a is not limited to the CMP treatment. For example, in this embodiment, LCBO which is water soluble is used as the second solid electrolyte 114, and therefore, the positive electrode active material 112 may be exposed by applying water or a solution containing water to the electrode assembly 111 so as to dissolve the second solid electrolyte 114 in a surface layer of the electrode assembly 111.

In the lithium reduction resistant layer forming step of the step S15 to the negative electrode layer forming step of the step S16, as shown in FIG. 16, a lithium reduction resistant layer 115 and a lithium metal layer 116 are sequentially formed and stacked by, for example, a sputtering method on the other surface 111b on the opposite side to one surface 111a subjected to the surface treatment in the previous step S14. Then, the process proceeds to the step S17.

In the current collector forming step of the step S17, as shown in FIG. 17, a current collector 117 is formed on one surface 111a of the electrode assembly 111, and a current collector 118 is formed so as to be in contact with the lithium metal layer 116. Specifically, an Au foil as the current collector 117 is bonded to one surface 111a of the electrode assembly 111, and a Cu foil as the current collector 118 is bonded to the lithium metal layer 116. By doing this, a lithium-ion battery 110D of this embodiment in which the electrode assembly 111, the lithium reduction resistant layer 115, and the lithium metal layer 116 are interposed between the current collector 117 and the current collector 118 is obtained.

According to the method for producing a lithium-ion battery of the second embodiment described above, the following effect is obtained in addition to the effects (1) to (8) of the first embodiment described above.

(9) The electrode assembly 111 obtained by the steps S11 to S13 is subjected to the surface treatment in the step S14, and therefore, the positive electrode active material 112 can be reliably exposed on one surface 111a of the electrode assembly 111. Therefore, in the step S17, by forming the current collector 117 on one surface 111a of the electrode assembly 111, as compared with the above-mentioned first embodiment, an area where the positive electrode active material 112 of the electrode assembly 111 and the current collector 117 are in contact with each other is increased, and thus, more reliable joining can be achieved.

The invention is not limited to the above-mentioned embodiments, and appropriate modifications are possible without departing from the gist or idea of the invention readable from the claims and the entire specification, and a method for producing an electrode assembly thus modified and a method for producing a lithium-ion battery to which the method for producing an electrode assembly is applied are also included in the technical scope of the invention. Other than the above-mentioned embodiments, various modification examples can be contemplated. Hereinafter, modification examples will be described.

Modification Example 1

The molded body to be impregnated with the melt 114M of the second solid electrolyte 114 is not limited to the composite body 111P in which the porous molded body 112P composed of the positive electrode active material 112 and the first solid electrolyte 113 are combined. It may be a molded body 112P composed of the positive electrode active material 112 which is not combined with the first solid electrolyte 113. That is, the electrode assembly 111 may be configured such that the molded body 112P and the second solid electrolyte 114 are combined.

Modification Example 2

The electrode assembly 111 is not limited to those including the positive electrode active material 112. For example, a carbon-based material such as acetylene black, Ketjen black, or a carbon nanotube having an electron conduction property is used as the active material, and is combined with a solid electrolyte containing Li, whereby an electrode assembly functioning as a negative electrode and an electrolyte can be provided.

REFERENCE SIGNS LIST

100: coin type battery, 110, 110D: lithium-ion battery, 111: electrode assembly, P: composite body as molded body, 112: positive electrode active material as active material, 112P: molded body composed of positive electrode active material, 113: first solid electrolyte, 114: second solid electrolyte, 114M: melt of second solid electrolyte, 115: lithium reduction resistant layer, 116: lithium metal layer, 117, 118: current collector

The invention claimed is:

1. A method for producing an electrode assembly comprising:
   a first step of forming a molded body containing an active material;
   a second step of dipping the molded body in a melt of a solid electrolyte in a first atmosphere, thereby impregnating the melt into voids inside the molded body; and
   a third step of cooling the molded body impregnated with the melt by moving the molded body to a second atmosphere whose temperature is lower than that of the first atmosphere, thereby combining the molded body with the solid electrolyte.

2. The method for producing an electrode assembly according to claim 1, wherein in the second step, an end portion of the molded body is dipped in the melt, and the melt is impregnated into the voids inside the molded body by capillary phenomenon.

3. The method for producing an electrode assembly according to claim 1, wherein in the third step, the molded body is cooled by being moved to the second atmosphere from the first atmosphere so that the temperature of the molded body decreases by 10° C. or more per minute.

4. The method for producing an electrode assembly according to claim 1, wherein a gas for cooling is introduced into the second atmosphere.

5. The method for producing an electrode assembly according to claim 4, wherein
the molded body contains a lithium composite metal compound as the active material,
the solid electrolyte is a compound containing Li, C, and B, and
the gas for cooling contains $CO_2$.

6. The method for producing an electrode assembly according to claim 1, wherein the solid electrolyte combined in the third step contains an amorphous phase.

7. The method for producing an electrode assembly according to claim 1, wherein the molded body has a porosity of 30% or more and 70% or less.

8. A method for producing a lithium-ion battery, comprising:
a fourth step of forming a lithium reduction resistant layer on an electrode assembly produced using the method for producing an electrode assembly according to claim 1;
a fifth step of forming a lithium metal layer on the lithium reduction resistant layer; and
a sixth step of forming a current collector so as to be in contact with at least one of the electrode assembly and the lithium metal layer.

9. The method for producing a lithium-ion battery according to claim 8, wherein the sixth step includes a bonding step of bonding a metal foil as the current collector to the molded body before the second step.

10. The method for producing a lithium-ion battery according to claim 8, wherein the sixth step includes a surface treatment step of subjecting a surface on the opposite side to a surface, on which the lithium reduction resistant layer is formed, of the electrode assembly to a surface treatment, thereby exposing the active material after the third step.

* * * * *